US012100988B1

(12) United States Patent
Daniels

(10) Patent No.: US 12,100,988 B1
(45) Date of Patent: Sep. 24, 2024

(54) PORTABLE HUMAN POWERED ELECTRIC POWER GENERATING DEVICE

(71) Applicant: Lewis Daniels, Philadelphia, PA (US)

(72) Inventor: Lewis Daniels, Philadelphia, PA (US)

( * ) Notice: Subject to any disclaimer, the term of this patent is extended or adjusted under 35 U.S.C. 154(b) by 0 days.

(21) Appl. No.: 18/377,711

(22) Filed: Oct. 6, 2023

Related U.S. Application Data

(60) Provisional application No. 63/459,185, filed on Apr. 13, 2023.

(51) Int. Cl.
*H02J 7/14* (2006.01)
*H02K 7/18* (2006.01)

(52) U.S. Cl.
CPC .......... *H02J 7/1415* (2013.01); *H02K 7/1861* (2013.01)

(58) Field of Classification Search
CPC ..................................... H02J 7/1415
USPC ........................................ 320/107
See application file for complete search history.

(56) References Cited

U.S. PATENT DOCUMENTS

| | | | | |
|---|---|---|---|---|
| 5,838,138 A * | 11/1998 | Henty | ................ | G06F 3/0338 320/135 |
| 2004/0090070 A1 * | 5/2004 | Eisenbraun | ............... | H02J 7/32 290/1 R |
| 2004/0090210 A1 * | 5/2004 | Becker | ................ | F21L 13/06 290/1 R |
| 2005/0083683 A1 * | 4/2005 | Ho | ................ | F21L 13/00 362/208 |
| 2005/0231154 A1 * | 10/2005 | Yueh | ................ | G06F 1/263 320/103 |
| 2006/0164037 A1 * | 7/2006 | Kuo | ................ | H02J 7/32 320/115 |
| 2008/0150493 A1 * | 6/2008 | Bulthaup | ............. | H02K 7/1853 310/78 |
| 2009/0015022 A1 * | 1/2009 | Rome | ................ | F03G 5/00 290/1 A |
| 2012/0028538 A1 * | 2/2012 | Wong | ................ | H02K 7/1861 446/457 |
| 2013/0033223 A1 * | 2/2013 | Liu | ................ | H02J 7/0013 320/107 |
| 2015/0185771 A1 * | 7/2015 | Clark | ................ | H02K 7/1861 307/154 |
| 2018/0091022 A1 * | 3/2018 | Garrison | ................ | H02J 7/32 |
| 2019/0363611 A1 * | 11/2019 | Bagdon | ................ | F03G 5/06 |
| 2020/0405040 A1 * | 12/2020 | Garrison | ................ | H02J 7/32 |
| 2023/0208164 A1 * | 6/2023 | Mazzocchi, Jr. | ...... | A45C 11/00 320/107 |

* cited by examiner

Primary Examiner — Jerry D Robbins
(74) Attorney, Agent, or Firm — Andrew C. Aitken

(57) ABSTRACT

A manual power generating device for generating electricity to charge accessories is disclosed and includes a plurality of springs connected to a gear set and generator that, as they retract to a home position, will drive the gear set which is connected to a generator to create a current.

13 Claims, 13 Drawing Sheets

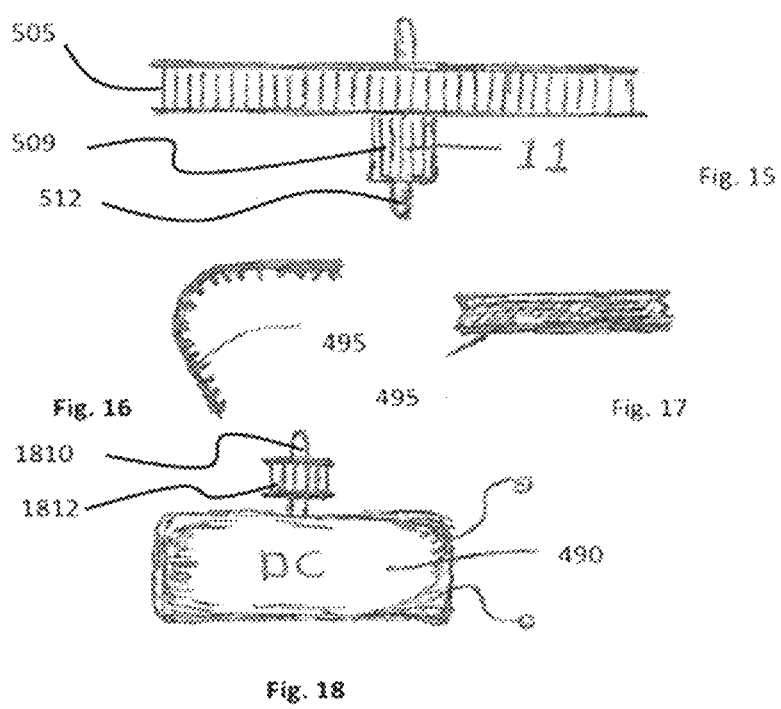
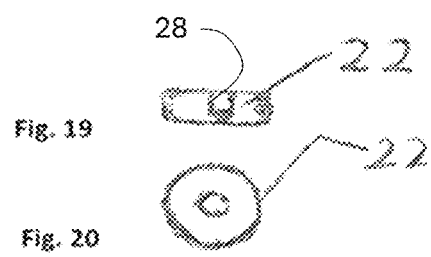

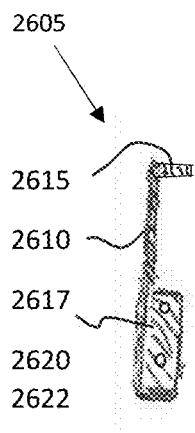
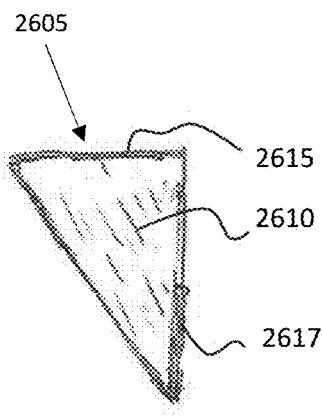
Fig. 26a      Fig. 26b
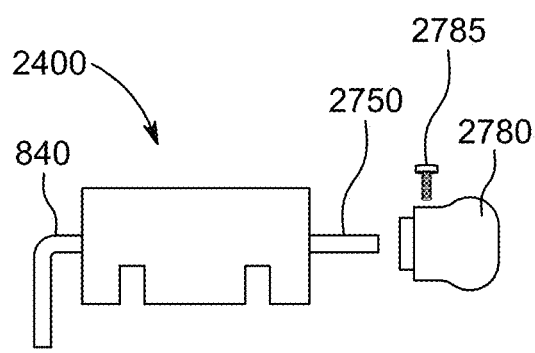
FIG. 27
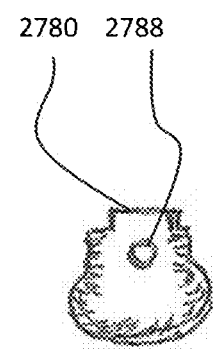
Fig. 28

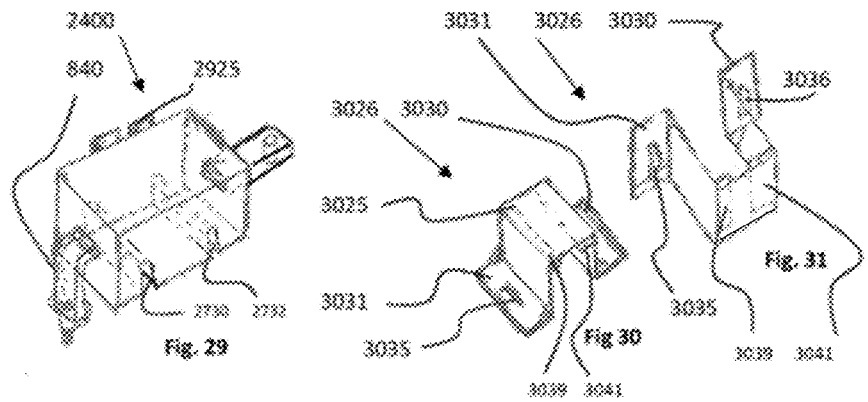
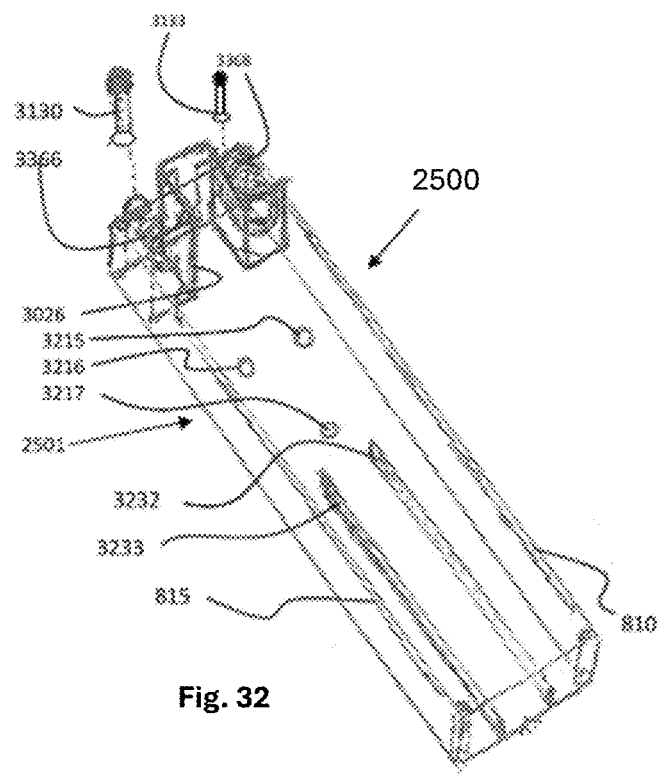
Fig. 32

PORTABLE HUMAN POWERED ELECTRIC POWER GENERATING DEVICE

CROSS REFERENCE TO RELATED APPLICATIONS

The applicant claims the benefit of the filing date of U.S. App. No. 63,459,185 that was filed on Apr. 20, 2023.

BACKGROUND OF THE INVENTION

With the widespread adoption of personal electronic devices such as smartphones, smartwatches, wireless speakers, earbuds, flashlights, and electronic books that use rechargeable batteries, there is related need to provide manners to charge such devices when a source of electricity is not readily available. Such needs are particularly acute when any useful electric power source is remote and during power outages.

SUMMARY OF THE INVENTION

The present invention is directed to a portable, human powered charger that can be used to recharge electronic devices. The present invention can be used to charge a variety of devices, including an iPhone, flashlights, a GPS device, a smart watch, a tablet, laptop computer and is easy to operate and transport and, since it has a low profile, can be conveniently stored.

Portable charging devices are useful for many applications when the electric grid is out of service or access to the grid is limited or unavailable. Such devices are also useful when traveling when a user does not have an appropriate voltage regulator to charge devices or when the power grid is unreliable. Portable charging device are also useful when camping and hiking when a source of electricity is not always available. Such devices may also be helpful during power service interruptions due to weather or natural disasters. Since solar powered chargers rely on the sun to generate electricity, they will not work at night, in the shade and as such, are not always a convenient or acceptable option. They also take considerable time to generate power, and are less effective during inclement weather, and, require significant surface area for the solar collector.

SUMMARY OF THE INVENTION

The invention uses a spring-loaded engine referred to as a power box that includes a resilient cord or spring that is designed to be stretched or extended by human power using a handle or lever that extends from the side of the device. When pressure or force is removed from the lever, the spring causes the handle and its assembly to return to its relaxed starting position and, as it retracts, it pulls on a spring loaded wire or cable which drives a first power transfer gear. Unlike many prior art devices that have used a rotating crank to drive the generator, the present device uses a rectilinear motion and a spring to power the gears that are connected to a generator. The power transfer gear is then reduced using a second gear and a drive belt connects the second gear to the generator. When the central armature of the generator is turned it creates a current that is directed to a voltage regulator that will alter the current as needed for various devices. The voltage regulator will detect when a connected battery has been fully charged and provide a signal or disconnect when the charge is reached. A light is provided to indicate that the device is charging. In embodiments, the device can also include a rechargeable battery that will store the electrical energy and could be used when a battery powered device needs a charge.

BRIEF DESCRIPTION OF THE DRAWINGS

FIG. 9 is a top view of a portion of gear assembly A.
FIG. 10 is a top view of second gear (showed with teeth) in the assembly A.
FIG. 11 is a top view of a spiraled spring used in gear assembly A to withdraw a cable that is attached to the handle assembly of the power box.
FIG. 12 is a side view in elevation of the coiled spring depicted in FIG. 11.
FIG. 15 is a side elevational view of a gear assembly B.
FIG. 16 is a fractional top view of a drive belt.
FIG. 17 is a side view of a drive belt.
FIG. 18 is an elevational view of a DC generator.
FIG. 19 is a side sectional view of a bearing seat.
FIG. 20 is a top view of a bearing.
FIG. 26a depicts a side view of stabilizer bracket 2605 for the power box frame.
FIG. 26b is a top view of bracket 2605.
FIG. 27 is a side exploded view of a core block assembly used in the power box frame.
FIG. 28 is a top view of the handle end of the core block assembly.
FIG. 29 is a perspective view of components of the core block assembly.
FIG. 30 is a top perspective view of a sliding bracket used in the power block assembly.
FIG. 31 is a rear side perspective view of a sliding bracket.
FIG. 32 is a perspective view of the power box that includes the sliding bracket and rail members.

DETAILED DESCRIPTION

Figure 1:
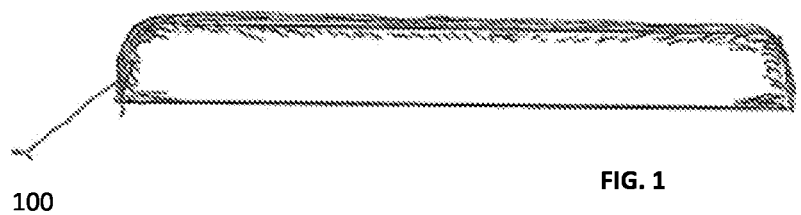
FIG. 1 is a side view in elevation of an embodiment of the invention.
Figure 2:
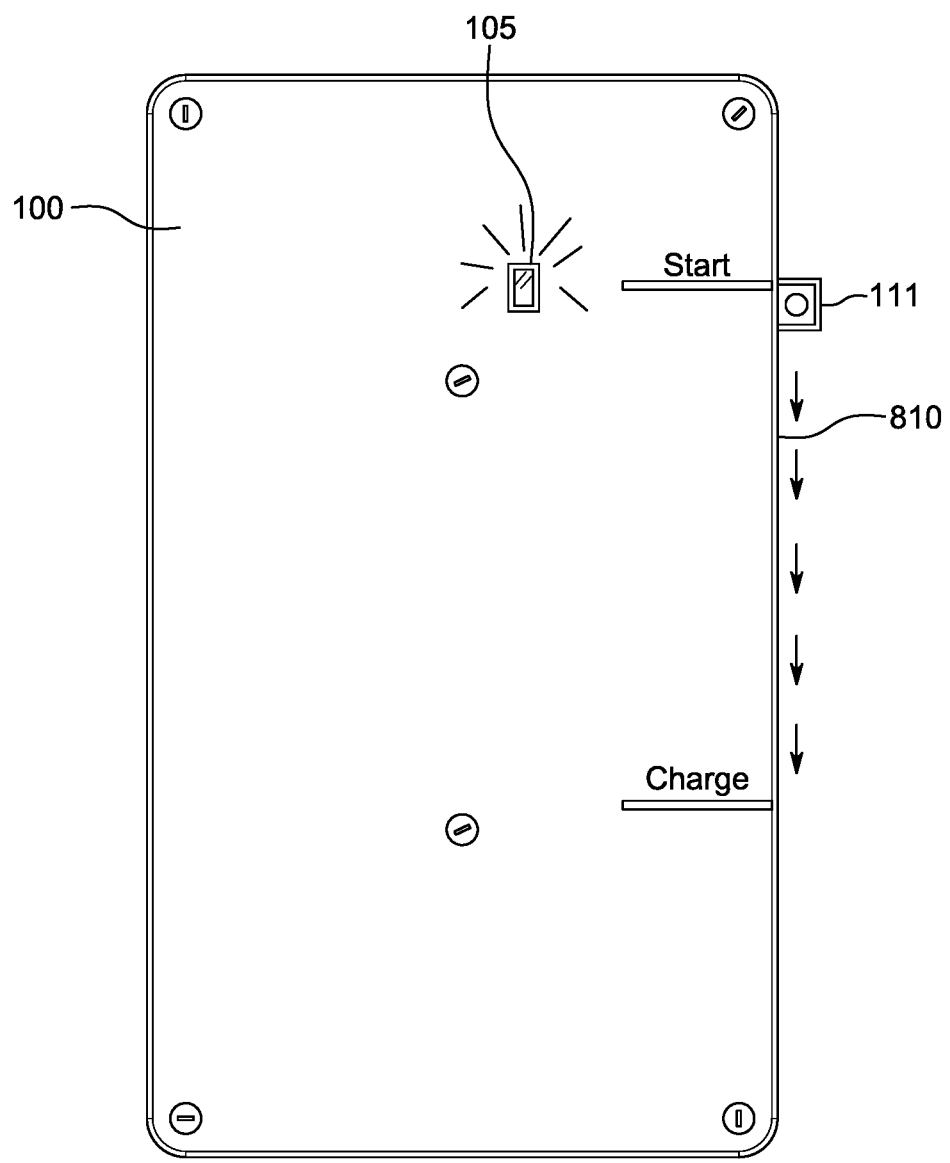
FIG. 2 is a top view in elevation of an embodiment of the invention.

Now referring to FIGS. 1 and 2, the device according to the invention includes top casing 100 that has a window 105 to allow for the visibility an indicator light 107 and an elongate slot 810 on a side surface to allow for lever 111 or handle that extends into the device. Casing 100 is configured to allow lever 111 to rectilinearly slide up and down slot 810. Cover 100 is formed to receive and hold the axle of the power transfer gear top and has other structures such as threaded openings 303 and 305 to assist with securing the top casing 101 to a bottom plate 727.

Figure 3:
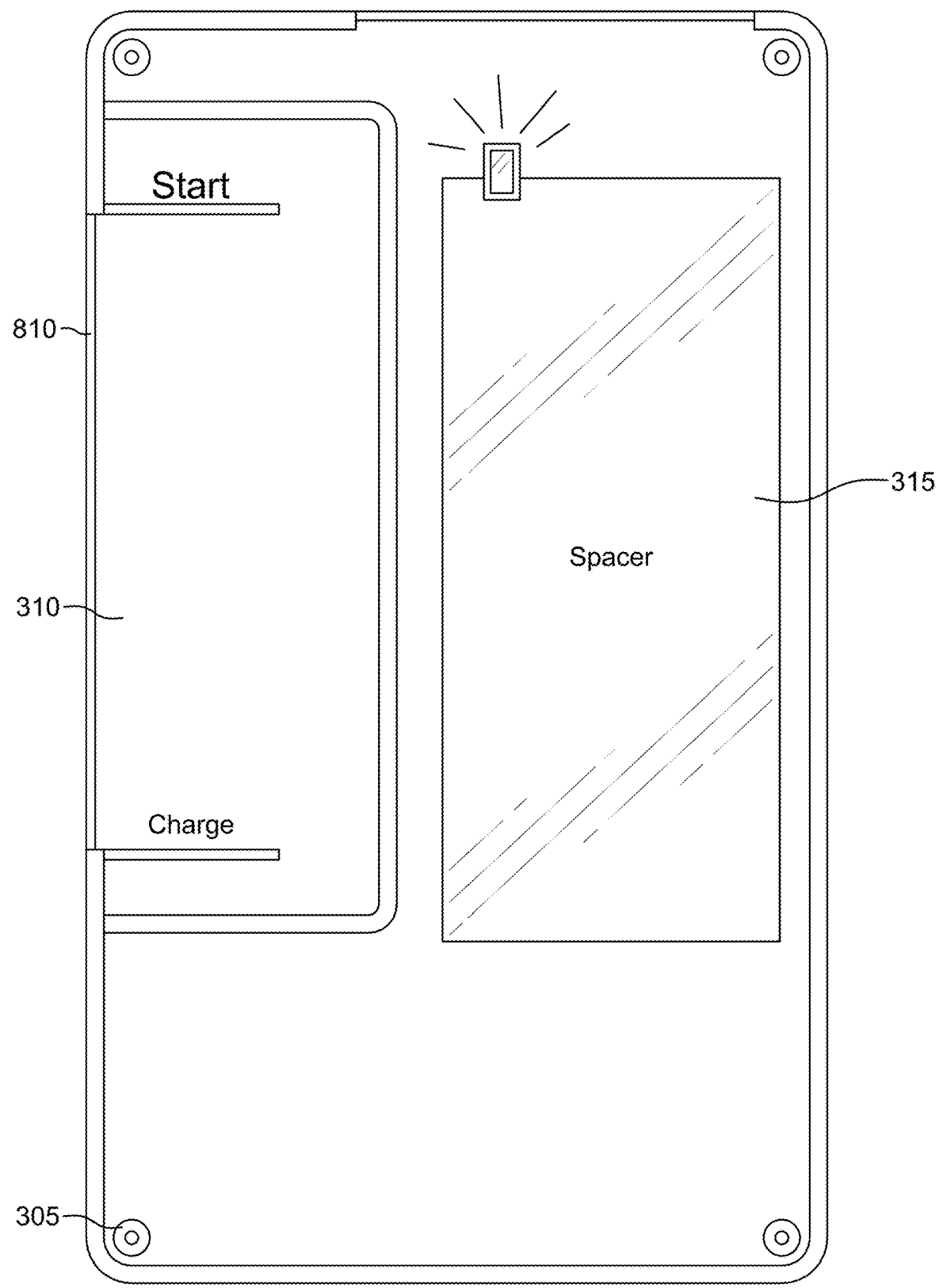
FIG. 3 is an inside view of the top cover.

FIG. 3 is a view of the inside surface 101 of top cover 100 that segments and defines power box region 310 in which the elastic power band or springs are positioned. A spacer 315 is provided inside the casing.

Figure 4:
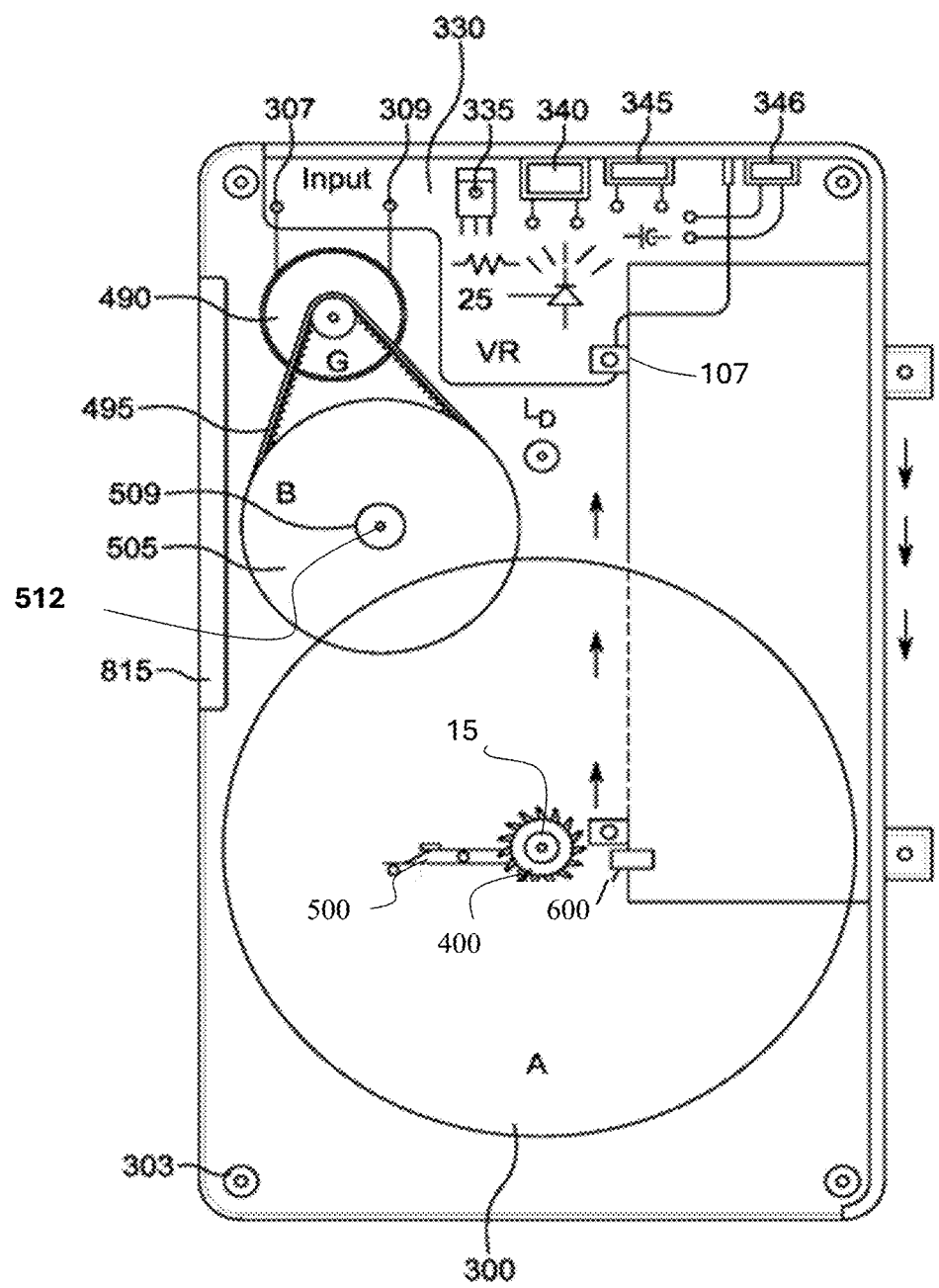
FIG. 4 is a top fractional view showing the gear arrangement of the device and major components.

FIG. 4 is a view of the gear arrangement that includes gear set A that includes primary or power transfer gear 300 which is concentric with power drive recoil gear 400 and has a locking arm 500 and counterweight 600. The teeth of power transfer gear 300 are not shown. Recoil gear 400 is connected to the manual power source which drives the power drive wheel and power transfer gear 300 around axle 15. Recoil gear 400 has a pawl or locking arm 500 arrangement to ensure rotation is limited to a single direction. In this regard, locking arm 500 will engage teeth on gear 400 and has a basing spring. Power transfer gear 300 engages and transfer motion to gear set B. and more particularly gear 509 of gear set B.

Gear set A also includes a recoil gear 400 assembly that includes spiral recoil spring 1170, locking arm or pawl 500 and counterweight 600 that is provided to balance locking arm 500.

Figure 21:
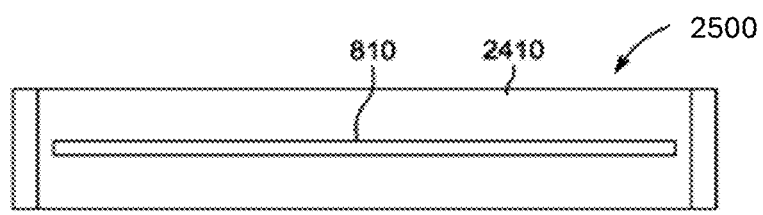
FIG. 21 is an exterior side view of the power box.

Now referring to FIG. 21, the side wall of power box 2500 and slot 810 is depicted. As seen in in FIG. 22, the power box 2500 includes core block element 2400 from which extends handle 800 that extends though slot 810 and is accessible on the side of the device. Handle 800 can be moved from a first start position 2270 to a second charge position 2275. When handle 800 has been moved to the charge position a spring urges block element 2400 back to the start position. On the opposite side of the core block element 2400 is linkage arm 840 that extends through a second slot 815 on which cable 850 is attached. The opposite end of cable 850 is attached to a drive wheel. A waterproof rubber gasket is glued to the side of the power box to limit or prevent the entry of liquid inside the charger. The handle 800 is mounted on core block element 2400 with a bolt and nut is configured to be comfortably engaged by a person's hand.

Referring back to FIG. 4, a side surface of the device is provided with a series of output connections 340, 345 and 346. Voltage regulator 335 senses when batteries are fully charged and stops the charging flow of current. It includes a light 107 to indicate the charging status of a connected battery including red, indicating a charge is needed, green indicating that the battery is charged and yellow, reflecting an intermediate status.

A transfer gear set is identified as gear set B in FIG. 4 that includes gear 505 and gear 509. The gear set includes central axle 509 that is mounted for rotation within the case. Gear 505 is connected to belt 495 that is connected to the armature of the generator 490. Generator 490 has output power that will vary to match the strength of the power box or electrical devices. The size of the generator may vary as well as the overall size of the casing.

A side view of transfer gear set B is illustrated in FIG. 15 which includes gear 505, gear 509 and central axle 512.

Figure 5:
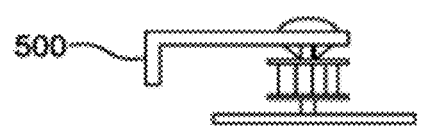
FIG. 5 is a side view in elevation of an axil and gear.
Figure 6:
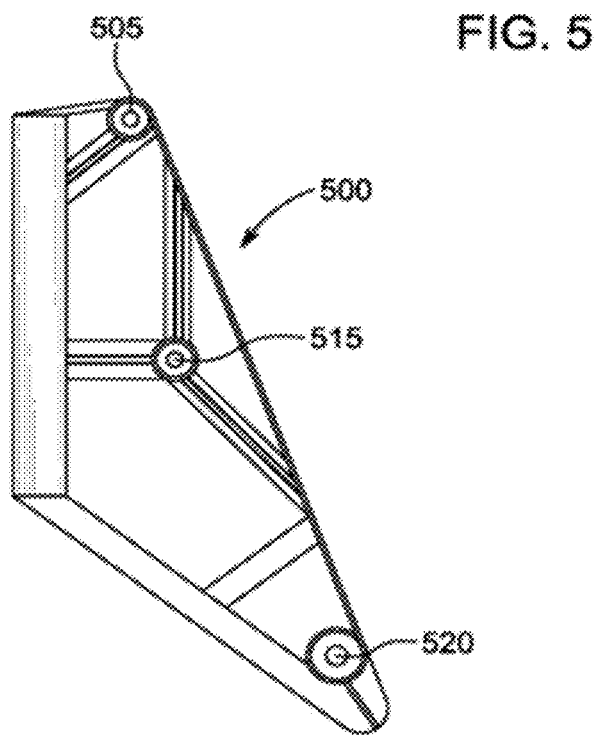
FIG. 6 is a support member for the seats of three of the gears used in the device.

Referring now to FIGS. 5 and 6, bracket 500 has three top axle mounting bearings; bearing 505 that engages the top of the generator and stabilizes the top 1810 of armature; Bearing 515 that engages the top of axle 509 of gear set B and bearing 520 that engages axle 15 of gear set A.

Figure 7:
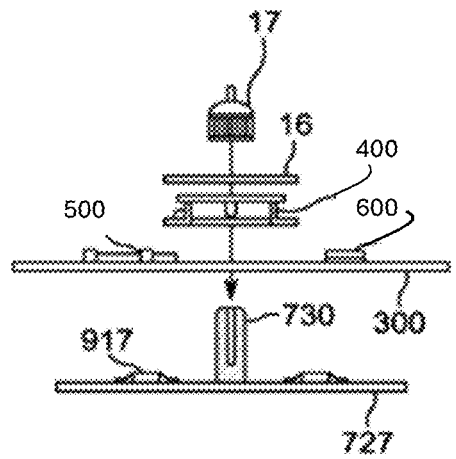
FIG. 7 is an exploded view of the power transfer gear and associated spring.

FIG. 7 depicts gear set A that includes built-in rollers such as roller 917 which is provided on lower bottom plate 727. Axle bearing 730 extends through power transfer gear 300 on which is locking arm 500 and counterweight 600. Also shown is gear 400 that includes the spring retainer groove. The teeth of the gear are located on the bottom part 402. A polished spacer ring 16 is positioned between the top acorn nut 17 and the recoil gear 400 that mitigates any binding between the elements. In an embodiment, acorn nuts are provided for gear sets A, B and C and are made of nylon and will turn in their respective seats with limited resistance. The top of acorn nut 17 is designed to fit into bracket seat 520. The recoil spring 1170 retained in gear 400 will return the recoil gear to a start position after the core block element 2400 has returned to its start position.

Figure 8:
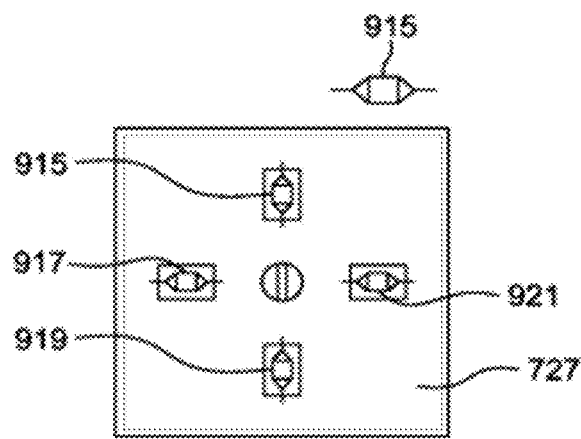
FIG. 8 is a top plan view of a series of rollers used to reduce friction from the power transfer gear.
Figure 13:
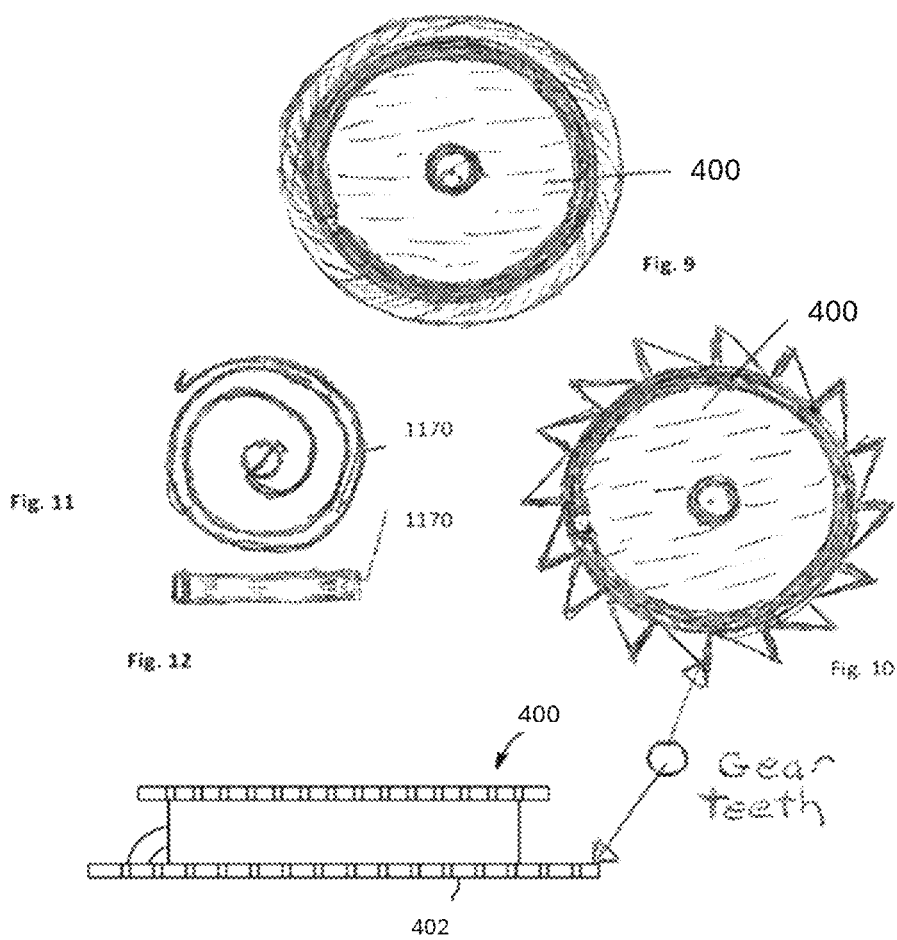
FIG. 13 is a side view of the retainer for the spring and bottom toothed gear.
Figure 14:
FIG. 14 is a view of the cable that is connected to the power box and spring.

A roller configuration is depicted in FIG. 8 which includes roller 915, 917, 919 and 921, each of which are barrel shaped and mounted for rotation on bottom plate 727. The lower side of power transfer gear 300 is supported and will engage the rollers and, consequently, the friction between the surfaces can be reduced.

Figure 22:
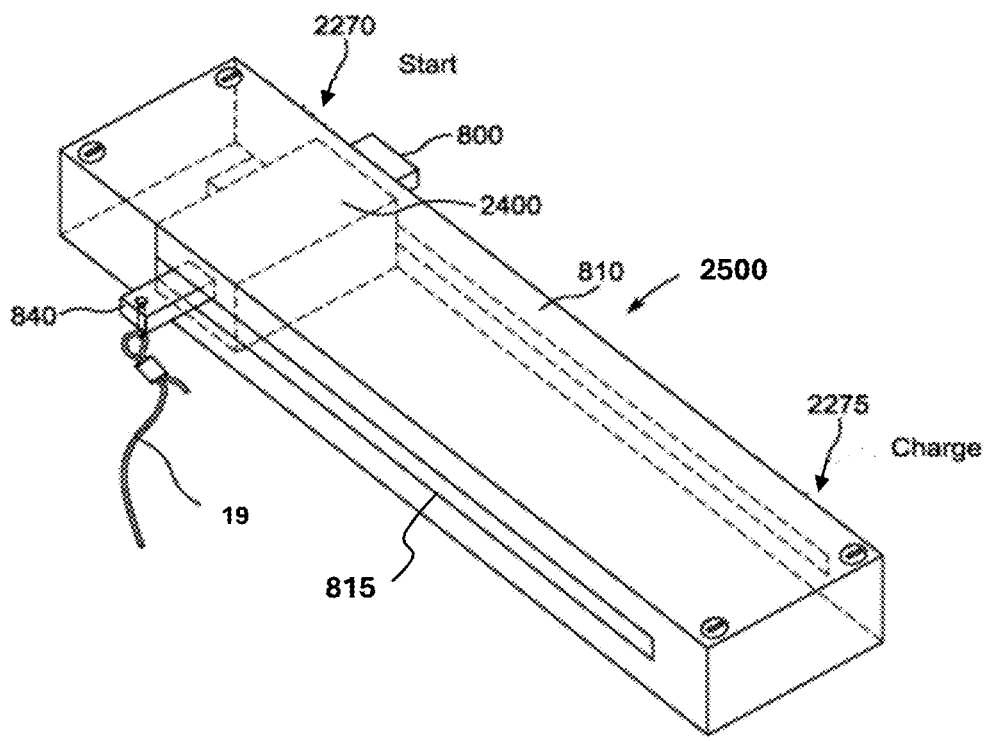
FIG. 22 is a perspective view of the manually manipulated power box with internal elements in phantom.
Figure 23:
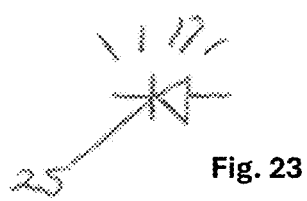
FIG. 23 is a schematic representation of an indicator diode.

FIG. 9 is a top view of recoil assembly of gear set A and FIG. 10 is a bottom view of the same gear set A wherein the teeth of gear 400 are depicted. The top portion of recoil gear 400 does not include teeth. Cable 19 is mounted in the slot 1350 and attached to spring recoil gear 1170 and is received in the groove defined by the top section 403 and bottom portion 402. One end of cable 19 is attached to the spring recoil gear and winds around the spring a few times. The opposite end of cable 19 is attached to linkage arm 840 as depicted in FIG. 22. FIGS. 19 and 20 depict the bottom seat 22 for axle 512 used with gear set B as illustrated in FIG. 15 and are mounted on the interior surface of bottom plate 727 of the device casing 100. The seat 22 has smooth cylindrical cavity 28 or conical cavity that receives the axle 512 and allows the axle to turn. The top and bottom axle seat are precisely located in the bracket or casing to minimize fraction and drag.

Figure 24:
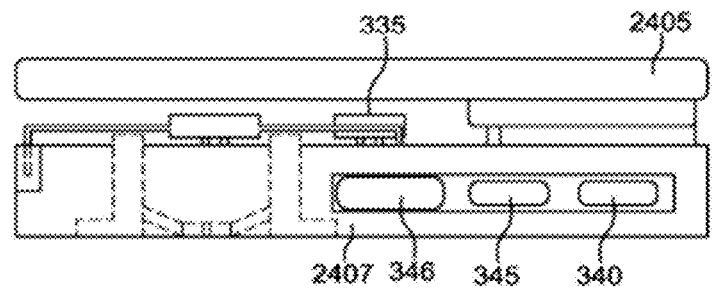
FIG. 24. is a side exploded view of an alternative embodiment of the invention.
Figure 25:
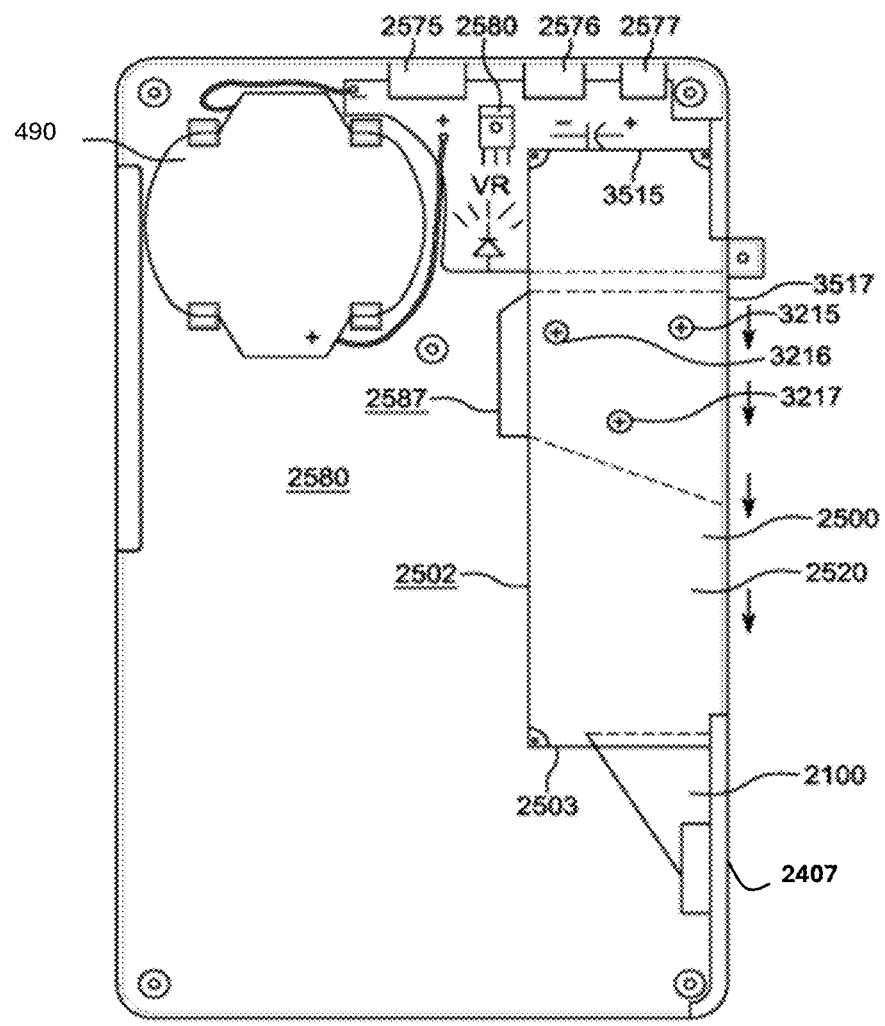
FIG. 25 is a top plan sectional view that includes a portion of the components of the alternative embodiment of FIG. 24.

Now referring to FIG. 24, an end view of exterior casing 100 is depicted with the top cover 2405 displaced. As best seen in FIG. 25, the power box 2500 is defined by sidewalls 2502, 2503, 3515 and 3517. The power box 2500 is secured and stabilized in place by brace 2100 that is connected to the sidewall 2503 of power box 2500 and lateral sidewall 2407 of casing 100. The bottom surface 2520 of power box 2500 is attached to the casing interior surface 2580 by reinforcement bracket 2587 and by fasteners at locations 3215, 3216 and 3217. Referring now to FIG. 27, the handle assembly includes elements that extend from a core block element 2400 and on one side there is linkage member 840 that is attached to the gear assembly A with cable 19. As best seen in FIG. 29, on bottom surface 2710 of core block element 2400 a pair of guide slots 2730 and 2732 are provided that are received on opposite rails provided on the bottom surface of power box 2500. On the rear of core block element 2400 is slot 2925 that is used to fasten central spring 3240. Core block element 2400 also has a handle extension assembly that includes a stem 2750 and handle end 2780. As can be seen in FIGS. 27-28, handle 2780 is held on stem 2750 using bolt 2785 inserted through opening 2788.

Referring now to FIGS. 30 and 31, in embodiments, a further component of the power box assembly is U shaped bracket 3026 that is characterized by center portion 3025 and lateral flanges 3030 and 3031. The flanges 3030 and 3021 each have hook member 3035 and 3036 on which springs may be attached.

FIG. 32 depicts sliding bracket 3026 positioned at the end of power box 2501. Post members 3130 and 3133 are adjacent to end wall 3515 and serve as attachment points for the springs 3366 and 3369. Also depicted on the bottom surface of the power box are rails 3232 and 3233 on which the core block element 2400 will slide.

Figure 33:
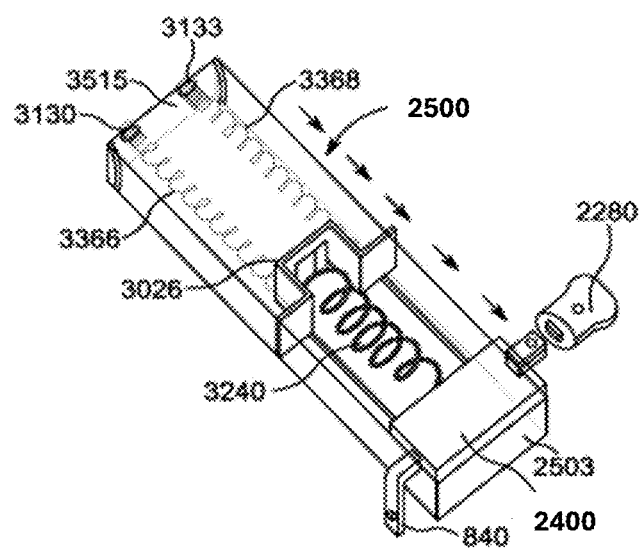
FIG. 33 is a perspective view of the power box showing the sliding bracket at a second location displaced from its home position and the handle assembly.

FIG. 33 depicts the core block element 2400 attached to sliding bracket 3026 with central spring 3240 that is attached to the center portion 3025 of the sliding bracket 3026. As best seen in FIGS. 30 and 32, the central spring 3420 is attached by engagement in a slot defined by tab 3039 and 3041 and surface 3025. As shown in FIG. 33, core block element 2400 and sliding bracket 3026 are shown in power box 2500 wherein the sliding bracket is located at a medial position in the box and core block element 2400 is near end wall 2503. As force is applied to the handle, springs 3366 and 3368 and center spring 3420 are each extended and thereby pull against opposite wall 3515. Movement of the sliding bracket 3026 is limited from traveling to the opposite end wall 2503 by its engagement of rails 3426 and 3428 that are located on the bottom surface of power box 2500. When force is released on handle 2280, springs 3366, 3368 and 3240 pull sliding bracket 3026 and core block element 2400 back toward the first position that is adjacent to power box wall 3515. The motion of the sliding bracket 3026 is limited to about one-half the distance to the endwall 2503 by its engagement of rails 3232 and 3233. When force is applied to handle 2280 sliding bracket 3026 is stopped by engagement of rails 3232 and 3233 by lateral flanges 3031 and 3136, but core member 2722 will continue to travel toward end wall 2503 pulling central spring 3420. When force is released on the handle, the core member is pulled back toward end wall 3515 and the linkage arm 840 pulls on the cable 19 attached to the gear assembly A, that causes the arm in the generator to rotate and create electricity.

Figure 34:
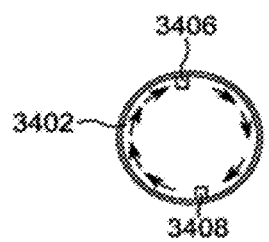
FIG. 34 is a top view of a ring commutator used in an embodiment of the invention.
Figure 35:
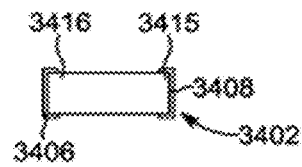
FIG. 35 is a side view of the commutator of FIG. 34.
Figure 36:
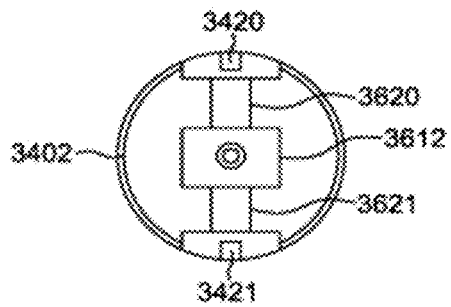
FIG. 36 is a top view of the armature of the generator within the commutator ring.

Now referring to FIGS. 25, and 34-36, the generator 490 includes commutator 3402 as illustrated in FIGS. 34-36 which is connected to the armature of the generator and through which DC current is provided to the electrical connection. The casing has support members that are integral to the casing and retain the generator assembly firmly into place. The commutator that collects AC current generated by the rotation of the armature though a magnetic field and rectifies or changes the current to direct current. This change is performed by providing a segmented part, with sections insulated from one another, which are alternately put in contact with the armature. When a brush in contact with a first segment transition to an adjacent section, the commutator reverses the current direction with each turn, serving as a mechanical rectifier converting alternating current created by the armatures rotation in the magnetic field, to a unidirectional current which is directed to an external load circuit used to recharge a battery. As the armature passes through the magnetic field, current is created which is drawn from the generator using brush contacts that are in electrical contact with the rotating commutator. In other embodiments commutators are provided with a plurality of contact bars or insulated segments that revolve with the armature winding. The commutator reverses the current flow within a winding when the shaft turns. In embodiments the generator may have multiple coils and the commutator may have multiple segments to diminish the pulsation of the current. In further embodiments the AC DC conversion is performed by a solid state bridge rectifier comprising a series of diodes that prevent the reverse flow of current and a capacitor to smooth the power output.

As seen in FIG. 34, commutator 3402 is ring shaped or annular and is divided into two segments by insulation spaces 3406 and 3408. In embodiments, insulation material is an epoxy resin. Tab members 3415 and 3416 extend on the top surface of each half of commutator ring 3402. FIG. 35 depicts a side view of commutator ring 3402 and tabs 3416 and 3415 that extend from the top of commutator ring 3402.

Figure 37:
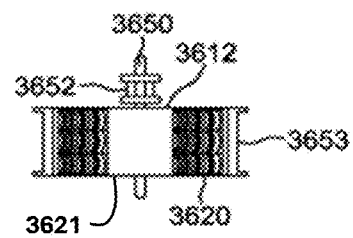
FIG. 37 is a side sectional view of the armature.

Referring now to FIG. 36, a top view of a ring commutator 3602 is shown which is attached to armature 3612 which has a core 3612 made from iron and arms 3620 and 3621. As seen in FIG. 37, the arms 3620 and 3621 are covered with copper windings and will rotate in the magnetic field on axis 3650 to create current. In embodiments 22 gauge copper wine is used to wind on the armature. The armature is powered by drive gear 3652 that is attached by a drive belt to gear set B. The ends of the arms have a cavity, such as cavity 4353 that receives commutator 3402 and indentions 3420 and 3421 are cut into the top surface of the armature ends to hold the commutator tab 3415 and 3416 to which the coils are soldered. Extending from the top of core 3612 is cylindrical axle rod 3650 and extending from the bottom of core 3612 is the opposite end axle rod 3650 on which core rotates.

Figures 38A, 38B:
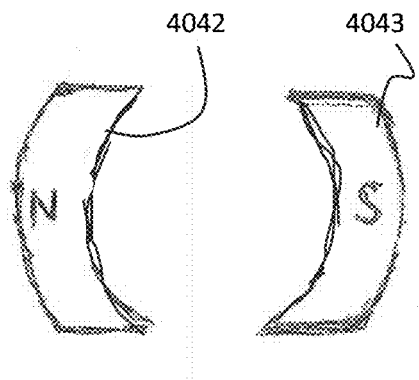
FIG. 38a is a top view of magnets used in the generator.
FIG. 38b is a top view of the opposite magnet used in the generator.
Figure 39:
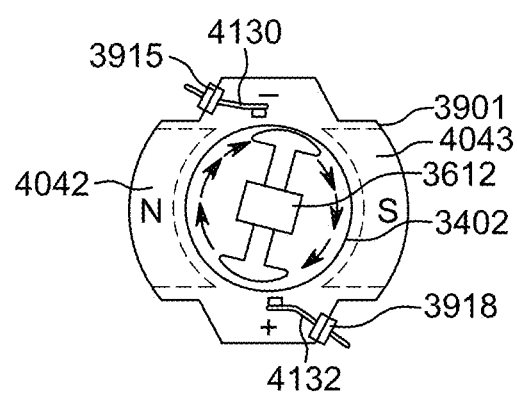
FIG. 39 is a top sectional view of the generator including two brush assemblies that take current from the commutator.
Figure 40:
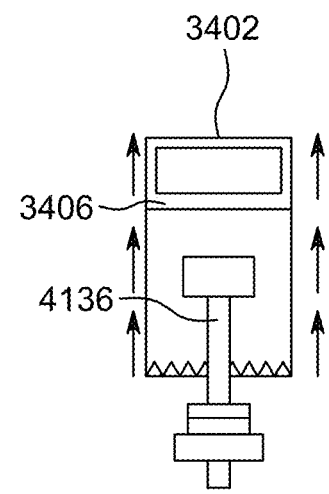
FIG. 40 is a side view of a brush assembly shown in engagement with the commutator.
Figures 41, 42, 43:
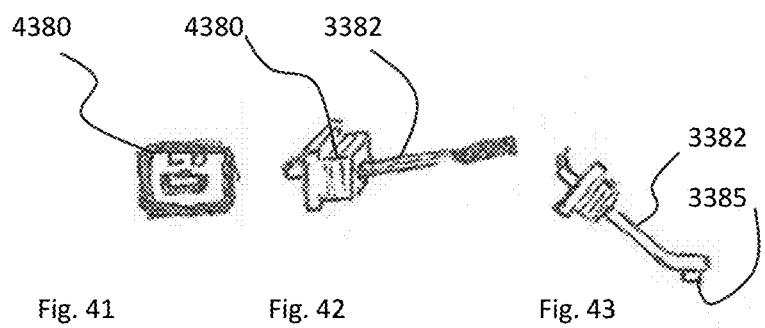
FIG. 41 is an end view of the brush assembly of FIG. 40.
FIG. 42 is a side perspective view of the brush assembly.
FIG. 43 is another side perspective view of the brush assembly that shows the contact pad.
Figure 44:
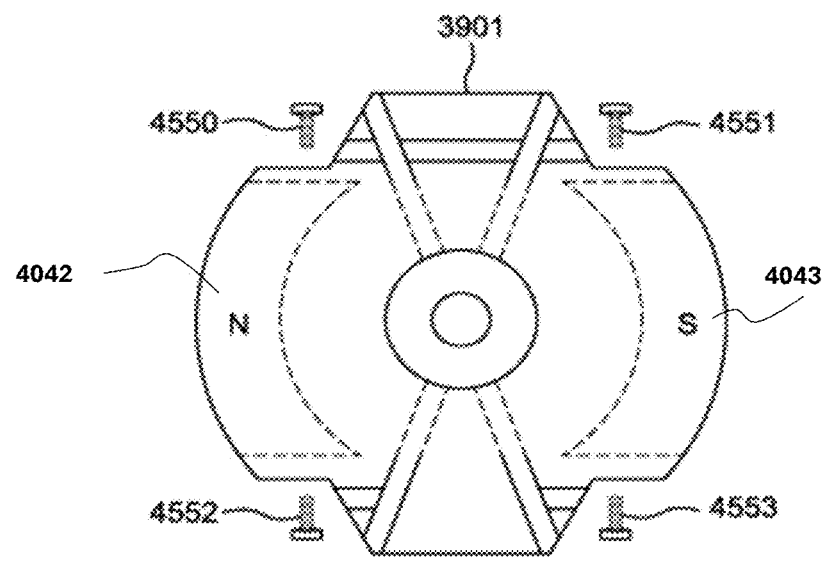
FIG. 44 is a top view of the bottom half of the generator case.

FIGS. 368a and 38b is a top view of two permanent magnets 4042 and 4043 that generate a magnetic field across the region in which the armature will turn. As seen in FIG. 39 magnets 4042 and 4043 are secured to casing 3901 with fasteners or adhesive. The casing also has openings 3915, 3918 for brushes 4130 and 4132. As seen in FIG. 40-43 the brushes contact the commutator segment surface 3402 as the assembly rotates in the magnetic field as they are driven the gear set B. As seen in FIGS. 41-43, the brushes include a mounting block 4380 that is received in the generator chassis and insulates and holds brush stem 3382. Brush stem 3382 is comprised of copper and is connected to the voltage regulator. A contact pad member 3385, preferably comprised of carbon, is provided on the end of stem 3382.

Figure 45:
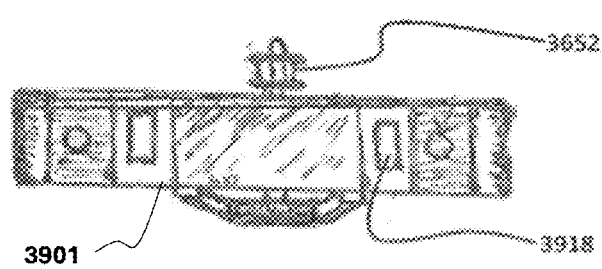
FIG. 45 is a side view of the generator.

The generator armature is contained withing the chassis as depicted in FIGS. 45 and 46. This view shows fasteners 4550 4551, 4552 and 4553 that secure the neodymium magnets in the generator chassis. As best seen in FIG. 46 the opening 3918 through casing 3901 for the brush assembly is depicted.

Although the disclosure has been described by reference to illustrative embodiments thereof, many changes and modifications of the disclosure may become apparent to those skilled in the art without departing from the spirit and scope of the disclosure. It is therefore intended to include within this disclosure all such changes and modifications as may reasonably and properly be included within the scope of the present disclosure's contribution to the art. Benefits, other advantages, and solutions to problems have been described above with regard to specific embodiments. However, the benefits, advantages, solutions to problems and any other element(s) that may cause any benefit, advantage, or solution to occur or become more pronounced are not to be construed as critical, required, or essential features or elements of any or all of the claims.

As used herein, the terms "comprise", "comprising" or any variation therefore, are intended to cover non-exclusive inclusion, such that a process, method, article, device or apparatus that comprises a list of elements does not include only those elements but may include other elements, boarder scope, alternative embodiments, mixture of, improvements not expressly listed or inherent to such processes, method, article, device, manufacture, or apparatus. Thus, the scope of the present disclosure is to be determined by the broadest permissible interpretation to the maximum extent allowed by law, of the following claims, and shall not be restricted or limited by the foregoing detailed description.

I claim:

1. A manual power generating device for charging accessories comprising;
    a case containing a manually powered engine,
    a gear set and
    a generator assembly,
    said manually powered engine comprising, a core member, a sliding bracket assembly and springs said springs comprising a primary spring and at least one secondary spring, and said core member, said sliding bracket and said springs contained in a frame,
    said core member further comprising a handle extending through an elongate slot through said case and an opposite linkage arm attached to a cable that has an opposite end attached to a spring gear, said cable connecting said linkage arm to a gear set on said spring gear and configured to turn a primary gear,
    and said core member attached to said sliding bracket by a primary spring and said sliding bracket attached to a base member by a secondary spring, wherein when a force is applied to said handle, said springs will extend from said base member and when force is removed said springs will retract towards said base member causing said cable to rotate said primary gear of said gear set and said motion of said gear set will drive an armature of said generator assembly to rotate in a magnetic field and create a current.

2. The manual power generating device recited in claim 1 wherein said device further comprises a set of rails on the bottom surface of said case and said core member is provided with lateral grooves that receive said rails, and said conversion device further comprises a stop member wherein said stop member prevents said sliding bracket from travelling past a predetermined location.

3. The device as recited in claim 2 wherein said sliding bracket is attached to said base member by at least two springs and said core member is attached to said sliding bracket by a central spring.

4. The device of claim 1 wherein said generator further comprising a commutator.

5. The device of claim 4 wherein said commutator comprises a ring commutator and said ring commutator is divided into at least two segments separated by an insulating material.

6. The device of claim 5 wherein said insulating material comprises epoxy.

7. The device of claim 4 wherein said commutator is comprised of a silver copper alloy.

8. The device of claim 4 wherein said commutator comprises a bridge rectifier.

9. A battery charging device comprising a generator for the creation of direct current using a manually powered engine, said engine comprising a frame with a first end on which two resilient members are attached, and the opposite end of said resilient members are attached to a core member that is configured to slide within said frame from a first location to a second location when force is applied to a handle that extends from said device, and wherein when force is removed, said resilient members will contract back toward said first location as said resilient members retract, a wire attached to said core member drives a primary gear member, wherein said primary gear member is attached to spring gear that maintains said wire in tension, and said primary gear member turns a second gear member that is connected by a drive belt to an armature core of said generator and turns said armature in a magnetic field to create current.

10. The battery charging device of claim 9 wherein said resilient members are springs.

11. The battery charging device of claim 10 wherein said engine further comprises a sliding bracket, said sliding bracket comprising a center surface and two offset side surfaces, said two said springs are attached to said offset surfaces of said bracket and further comprising a third spring attached to a center surface of said bracket and said core member.

12. The battery charging device of claim 11 further comprising guide rails provided on a bottom surface of said frame and wherein said core member further comprises opposite slots that are received by said guide rails.

13. The battery charger of claim 11 wherein said frame further comprises a stop member said stop member positioned in said frame to limit motion of said stop member a defined distance in said frame.

* * * * *